United States Patent Office 3,196,263
Patented July 20, 1965

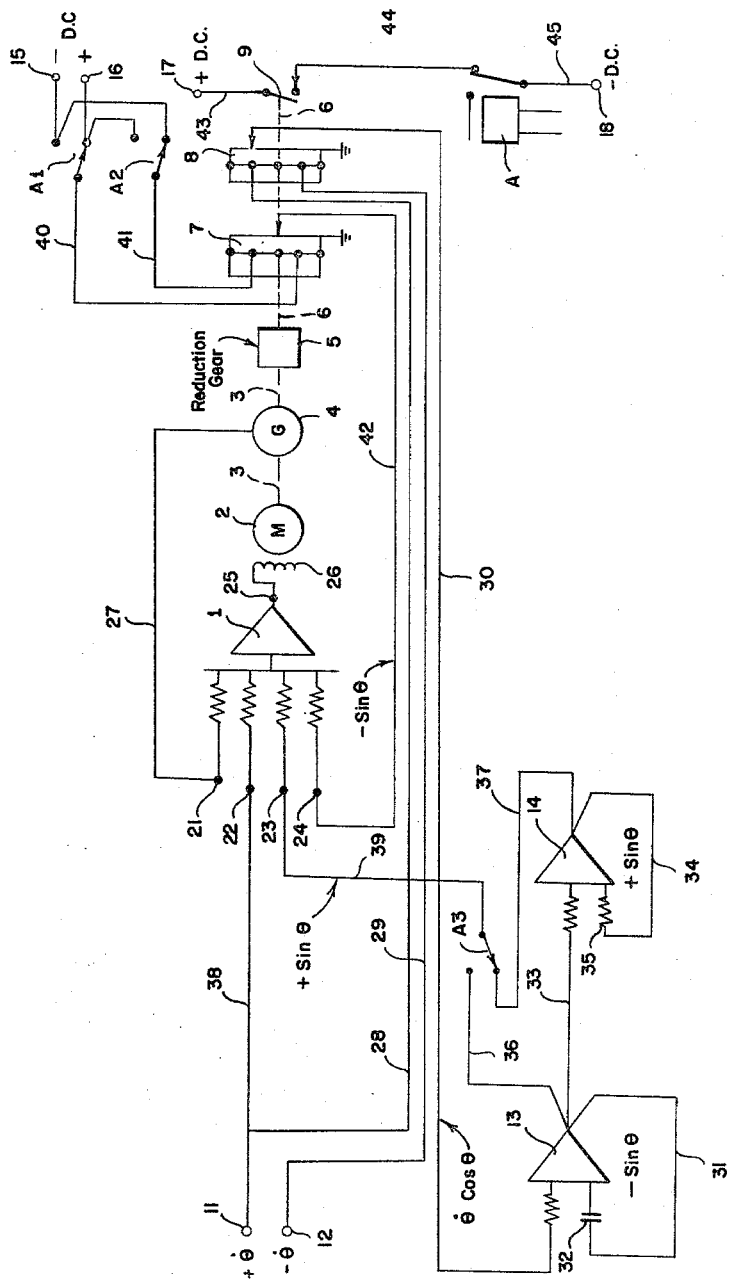

3,196,263
ELECTRONIC INTEGRATORS
Ronald Arthur Marvin, Horsham, England, assignor to Communications Patents Limited, London, England
Filed Sept. 8, 1961, Ser. No. 136,800
Claims priority, application Great Britain, Sept. 15, 1960, 31,778/60
5 Claims. (Cl. 235—183)

This invention relates to electronic integrators.

Electromechanical integrators of the velodyne type are subject to well-known limitations and errors. Due to the limited speed range possible, such a system is not responsive to small input signals. Due to the mechanical inertia of the system, its computed output signal lags behind the input signal for rapidly-changing signals, particularly such as occur during transient conditions. The gearbox forming a part of such systems necessarily gives rise to some backlash and a consequent error between increasing and decreasing output signals. If wire-wound potentiometers are driven by the system, to provide electrical output signals related to the velodyne system output, these electrical outputs shown an irregularity or "granularity" of variation due to the minute stepwise variation of output which is characteristic of wire-wound potentiometers.

Electronic integrators of the Miller integrator type are free of the mechanical limitations of the velodyne integrator, but suffer from other limitations. Such electronic integrators have a finite maximum output and cannot be used to simulate integrands of angles of rotation if the cycles of revolution are unlimited.

An example of such limitation is in integrators deriving pitch, roll or heading angles for a flight simulator.

In the case of pitch and roll angles, the greatest integration accuracy is necessary when the angle is at or near 0° or 180°, or multiples of 180°.

The object of the present invention is to provide an integrator which has an improved performance compared with the velodyne electromechanical or Miller electronic types referred to.

According to the present invention, an integrator system comprises a servo amplifier having a plurality of inputs and an output driving a servo motor, the servo motor output shaft driving a feedback generator and the input of a speed reduction gear, the output of the speed reduction gear driving a plurality of potentiometers, in which the input signal to the integrator corresponds to a rate of change of angular position and is supplied to one servo amplifier input and the feedback generator output signal is supplied to a second servo amplifier input, in which a signal corresponding to the sine of the integral of the input signal is supplied to a third input of the servo amplifier and in which a negative feedback signal corresponding to the sine of the integral of the input signal is supplied to a fourth input of the servo amplifier.

In order that the invention may be more fully explained, one embodiment will now be described in detail, by way of example, with reference to the accompanying drawing, the sole figure of which is a schematic diagram representing an integrator suitable for use as a pitch angle integrator or roll angle integrator for a flight simulator.

Referring to the figure, a servo amplifier 1 has input terminals 21, 22, 23 and 24 and an output terminal 25 feeding the winding 26 of a servo motor 2. The servo motor output shaft 3 drives a feedback generator 4 which provides a feedback signal on line 27 to input terminal 21 of the servo amplifier. The output shaft 3 also drives the input shaft of a speed reduction gear 5. The output shaft 6 of gear 5 drives two potentiometers 7 and 8, and a switching unit 9.

Two input terminals 11 and 12 are respectively supplied with signals corresponding to the rate of change of an angular position, pitch angle in this example, and minus this quantity. These quantities are represented as $+\dot{\theta}$ and $-\dot{\theta}$, respectively.

The terminals 11 and 12 are connected by lines 28 and 29 respectively to the two inputs of potentiometer 8. Terminal 11 is also connected by line 38 to input terminal 22 of the servo amplifier 1.

Potentiometer 8 is contoured according to a cosine law, so that the output signal on output line 30 is the product of pitch rate and the cosine of the pitch angle, that is $\dot{\theta} \cos \theta$.

The signal on line 30 is supplied to one input of a high-gain D.C. amplifier 13. Amplifier 13 has capacitive feedback 31, 32 so that it forms a Miller integrator.

The output of amplifier 13 is reversed in sign by a further amplifiers 14 having resistive feedback 34, 35.

The outputs of amplifiers 13 and 14 are respectively supplied on lines 36 and 37 to a switch A.3, through which one or other output is supplied on line 39 to input terminal 23 of servo amplifier 1.

Terminals 15 and 16 are respectively connected to negative and positive poles of a D.C. source and to two changeover switches A.1, and A.2, through which terminals 15 and 16 are connected by lines 40 and 41 to the two inputs of potentiometer 7, in either polarity.

Potentiometer 7 is contoured according to a sine law, so that a signal proportional to the sine of the pitch angle is supplied on output line 42. Line 42 is connected to input terminal 24 of servo amplifier 1.

Terminal 17 is connected to the positive pole of a D.C. source and by line 43 to switching unit 9. Unit 9 has solely a segmented track whereby line 43 is connected to an output line 44 when shaft 6 occupies a rotational position between 90°, through 180°, to 270° and is not so connected when shaft 6 occupies a rotational position between 270°, through 0° to 90°.

Line 44 is connected through a relay A, line 45 and terminal 18 to the negative pole of the D.C. source. Relay A controls switches A.1, A.2 and A.3, these switches being shown in the figure in the positions they occupy when the relay A is relaxed, that is for pitch angle values from 270° through 0° to 90°.

In the operation of the integrating system shown in the figure, the direct voltage values corresponding to pitch angle rate, $+\dot{\theta}$ and $-\dot{\theta}$, and $\theta$ obtained by integration of the value of $+\dot{\theta}$, are employed to derive the value $\dot{\theta} \cos \theta$ from potentiometer 8 driven by the output of pitch servo 1 to 6. This value is applied to the Miller integrator 13, designated $-\sin \theta$ in the figure, to derive the value $-\sin \theta$, this value being integral of the value $\dot{\theta} \cos \theta$ with respect to time. The negative sign is accounted for by sign reversal in amplifier 13. The $-\sin \theta$ output of integrating amplifier 13 is reversed in sign by amplifier 14, designated $+\sin \theta$ in the figure.

When relay A is relaxed, for pitch angles from 270° through 0° to 90°, the value $+\sin \theta$ is applied to input terminal 23 of servo amplifier 1 and is answered by the value $-\sin \theta$ on line 42.

Feedback from generator 4 on line 27 to input terminal 21 is provided to stabilise the pitch servo system from hunting.

For pitch angle values approximately 0°, the pitch angle servo system will position itself according to the integral of $\dot{\theta}$. Since the operation of integration is performed electronically by amplifier 13, the required high speed range is assured.

As the pitch angle becomes $+90°$ or $-90°$, the value of $\cos \theta$ becomes zero and hence the input of amplifier 13 on line 30 becomes zero. The output of amplifier 13, and hence the servo input on line 39, becomes constant and hence the system would tend to remain at such a value of +90° or —90°, regardless of the input pitch angle rate value $\theta$. This condition is prevented by the input of the value $+\theta$ to input terminal 22, this input value being scaled against the feedback value on line 27 to input terminal 21.

At +90° or —90°, the servo system has, in effect lost its positioning signals. Under these conditions, the servo becomes an integrating servo acting on command of the input signal $\theta$, the input to terminal 23 remaining substantially constant for small changes of $\theta$.

For values of pitch angle from 90° through 180° to 270°, the system of the figure, without switches A.1 and A.2, operates incorrectly, since the rate of change of voltage on line 42 with respect to the position of the servo shaft 6 changes sign in this region and would provide positive feedback. To prevent this state, switches A.1 and A.2 are operated by relay A to reverse the input polarity to potentiometer 7. At the same time the polarity of the sin $\theta$ input on line 39 to input terminal 23 is reversed by switch A.3.

At +90° or —90° rotation, the system of the figure has an integrating speed range corresponding to that of a conventional velodyne type integrator. At pitch angle values away from 90°, the speed range is greatly increased by the inclusion of electronic integration by the integrating amplifier 13. The speed range is a maximum when the pitch angle is 0° or 180°.

Also since the servo system is a positioning system, any backlash or mechanical lag in the gear 5 are within the servo loop, so that output errors due to these factors are minimised.

If trigonometric outputs are required, the two amplifiers 13 and 14 provide sin $\theta$ outputs having infinite resolution. The effect of "granularity" of output from the potentiometer cards is limited to rate values.

It will be seen, therefore, that many of the limitations of conventional integrating systems have been overcome by the system described herein.

What we claim is:

1. An integrator system comprising input terminal means adapted to be supplied with signals representative of the rate of change of an angular position, a servo amplifier having four input terminals and an output terminal, means connecting said input terminal means to a first input terminal, a servo motor having an output shaft, means connecting the output terminal of said servo amplifier to said servo motor to thereby drive said servo motor from said servo amplifier, a position feedback generator and a plurality of potentiometers drivingly connected to said output shaft, said generator having an output connected with a second input terminal of said servo amplifier, means including a first of said potentiometers for providing a derived signal corresponding to the sine of the integral of the rate signal and means including a second of said potentiometers for providing a derived signal corresponding to minus the sine of the integral of the rate signal, means for applying said first mentioned derived signal to a third input terminal of said servo amplifier, means for applying said second mentioned derived signal to a fourth input terminal of said servo amplifier, and rotary switch means connected to said shaft for reversing simultaneously the polarity of both said derived signals at values of the integral of the rate signal equal to plus or minus 90°.

2. An integrator system as set forth in claim 1, said first potentiometer being a cosine potentiometer having input terminals and an output terminal, means for connecting said last mentioned input terminals with said input terminal means for supplying to said first potentiometer signal corresponding to the rate signal and to minus the rate signal, and an integrating amplifier connected to said output terminal of said first potentiometer.

3. An integrator system as set forth in claim 2, said integrating amplifier comprising in series a Miller integrator and a signal reversing amplifier.

4. An integrator system as set forth in claim 1, said second potentiometer being a sine potentiometer having input terminals, a direct current supply having positive and negative poles, and means connecting said poles to said last mentioned input terminals.

5. An integrator system as set forth in claim 1, and speed reduction gear means connected for driving from said motor and to said potentiometers.

References Cited by the Examiner
UNITED STATES PATENTS 2,949,233    8/60    Fogarty _____ 235—186
3,018,051    1/62    Hemstreet _____ 235—193

MALCOLM A. MORRISON, *Primary Examiner.*